United States Patent [19]

Sewell et al.

[11] Patent Number: 5,389,120

[45] Date of Patent: Feb. 14, 1995

[54] HEATING, VENTILATION AND AIR CONDITIONING UNIT WITH AUTOMATICALLY CONTROLLED WATER SPRAY AIR PURIFICATION SYSTEM

[76] Inventors: Frederic D. Sewell, 9644 Rocky Branch Dr., Dallas, Tex. 75243; Barry D. Jones, 14 Flourite Ct., Little Rock, Ak. 77212

[21] Appl. No.: 192,988

[22] Filed: Feb. 8, 1994

[51] Int. Cl.⁶ .............................................. B01D 47/06
[52] U.S. Cl. .......................................... 55/223; 55/228; 55/233; 55/242; 55/257.2; 55/269; 55/419
[58] Field of Search ..................... 95/212, 281, 25, 20, 95/14, 17; 55/270, 210, 274, 223, 228, 229, 233, 242, 257.2, 268, 269, 418, 419

[56] References Cited

U.S. PATENT DOCUMENTS

| | | | |
|---|---|---|---|
| Re. 18,328 | 1/1932 | Fedeler | 95/281 X |
| 813,217 | 2/1906 | Kinealy | 55/257.2 |
| 1,042,864 | 10/1912 | Winks | 55/223 X |
| 1,514,835 | 11/1924 | Darrah | 55/223 X |
| 2,057,579 | 10/1936 | Kurth | 55/223 |
| 2,233,976 | 3/1941 | Essick | 261/90 |
| 2,802,543 | 8/1957 | Clark | 55/242 X |
| 3,006,436 | 10/1961 | Starbuck et al. | 55/257.1 X |
| 3,522,000 | 7/1970 | Kinney | 55/223 X |
| 3,608,274 | 9/1971 | Stingelin et al. | 55/220 X |
| 3,701,235 | 10/1972 | Isaacson | 55/220 X |
| 3,731,459 | 5/1973 | Foster | 55/223 X |
| 4,323,373 | 4/1982 | Fritz | 95/281 |
| 4,484,937 | 11/1984 | James et al. | 55/223 |
| 4,676,811 | 6/1987 | Wade | 55/223 |
| 4,731,100 | 3/1988 | Loeffelmann et al. | 55/242 X |
| 4,954,148 | 9/1990 | Alexander, Sr. | 55/223 |

*Primary Examiner*—Richard L. Chiesa
*Attorney, Agent, or Firm*—Konneker Bush Hitt & Chwang

[57] ABSTRACT

An automatically controlled water spray air purification system is incorporated in a heating, ventilating and air conditioning unit serving a conditioned interior building space. The purification system is operative to receive a portion of the return air that would normally be flowed through the unit, mix the received return air with a quantity of outside ventilation air, purify the return air/outside air mixture using water sprayed from a sump portion of the purification system, and flow the purified air into the unit for mixture therein with the balance of the return air being flowed therethrough to the conditioned space. Damper structures on the unit and its associated air purification system permit selective variance of the percentage of the unit discharge air that has traversed the purification system. The water spray portion of the purification system is served by a pump forcing water from a sump structure through a filter, with the spray water draining back into the sump after cleansing air traversing the purification system. Upon a sensed demand therefor, an additive injector adds suitable chemical treatment material to the sump water, and a water pollutant monitor structure operates to backwash the filter upon sensing an undesirable pump back pressure increase or a buildup of particulate and gaseous pollutants in the sump water. A dehumidification structure incorporated in the purification system is automatically controlled to remove moisture from purified air exiting the purification system.

36 Claims, 2 Drawing Sheets

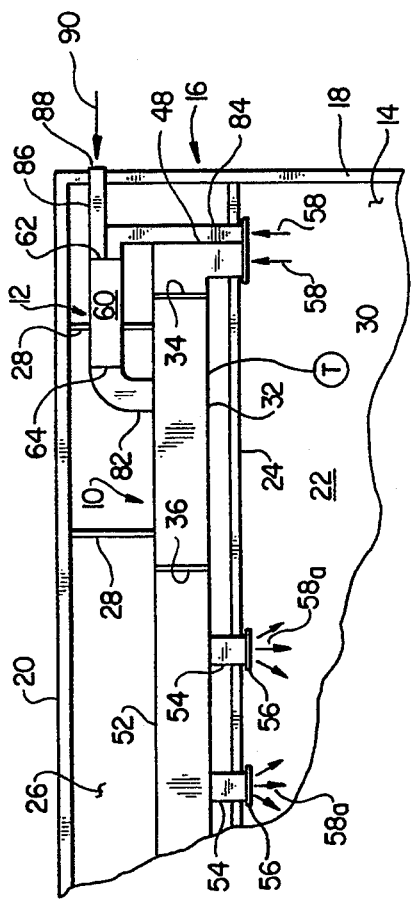
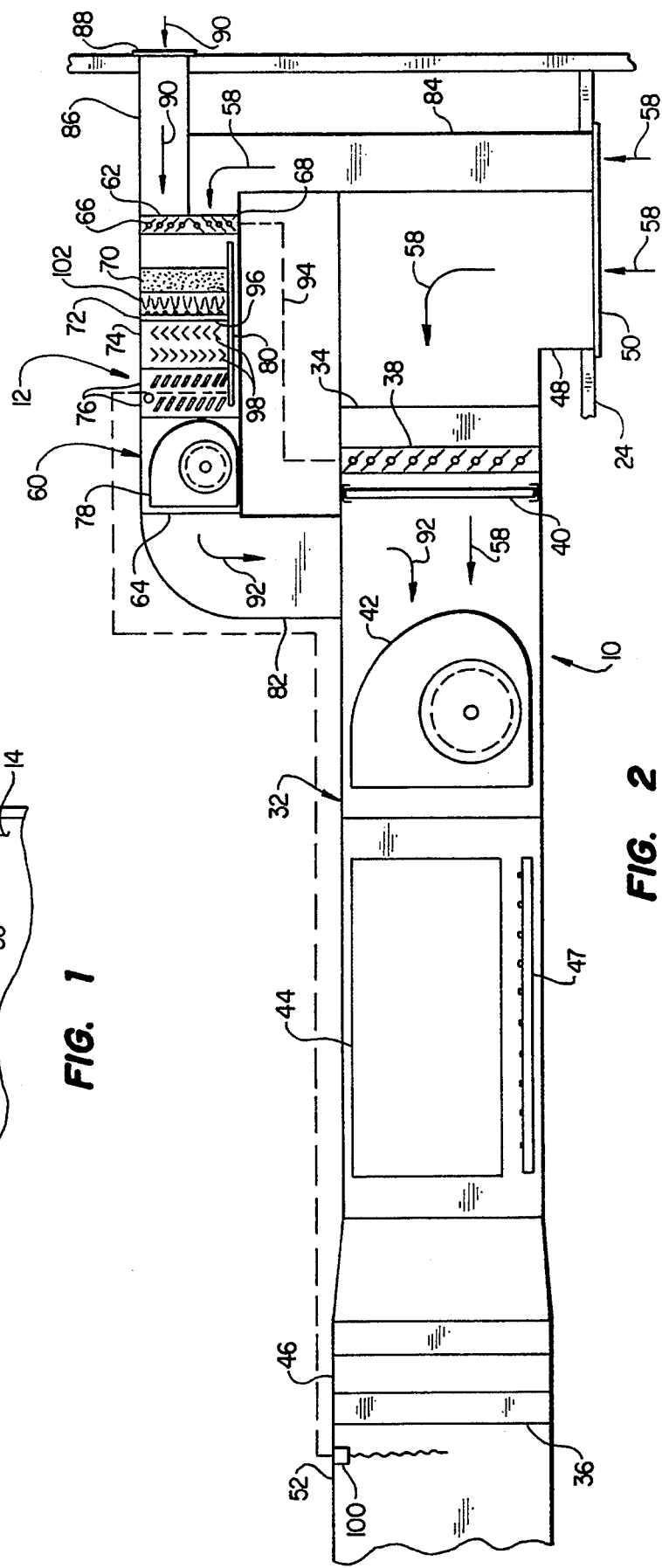
FIG. 1
FIG. 2

5,389,120

HEATING, VENTILATION AND AIR CONDITIONING UNIT WITH AUTOMATICALLY CONTROLLED WATER SPRAY AIR PURIFICATION SYSTEM

BACKGROUND OF THE INVENTION

The present invention generally relates to environmental control apparatus and, in a preferred embodiment thereof, more particularly relates to an improved liquid spray air purification system operatively incorporated in a heating, ventilation and air conditioning unit serving an interior building space.

Interior spaces of homes and other buildings are typically provided with automatically controlled temperatures using one or more air handling units that provide a recirculating flow of air drawn out of the conditioned space, flowed through the air handling unit by an air blower therein, heated or cooled as necessary within the unit, and then flowed back into the conditioned space. In addition to providing the desired temperature control within the conditioned space, air handling units of this general type are also often provided with the capability of purifying, at least to some extent, air flowing through the units.

The most common device used for this air purification task is the familiar replaceable flow-through air filter element that is disposed within the unit cabinet structure in the path of air being forced therethrough on its way back to the conditioned space served by the unit. Filters of this type are typically formed from a matted fibrous material (such as fiberglass) that serves to trap particulate matter, such as dust, borne in the conditioned space return air entering the unit. Additionally, electrostatic air filters are often incorporated in air handling units and provide improved particulate removal performance due to their electrostatic attraction and trapping of particulates substantially smaller than the ordinary fibrous filter can effectively capture.

However, as is well known, undesirable air pollutants are present in a variety of forms other than the relatively easy to capture particulates that the fibrous and electrostatic filter structures are designed to remove from the recirculated air from the conditioned space. Another known type of air purification process is the use of a liquid spray, typically a water spray, directed against filter element through which air to be supplied to a conditioned space is flowed. The liquid spray is maintained in continuous contact with the flowing air traversing the filter element, and, depending on the type of air purification system in which it is incorporated, serves to entrain a variety of airborne particulates as well as other types of pollutants such as aerosols, nitrogen oxides, sulfur oxides, carbon dioxides and monoxides, hydrogen sulfides and hydrocarbons, and then be drained away carrying entrained pollutants with it.

Despite the pollution removing effectiveness of various known types of liquid spray air purification systems, their use has typically been limited to industrial and commercial applications, as opposed to residential applications, due to reasons such as complexity, cost and increased maintenance requirements compared to dry filtering systems. Because of the increased awareness of air polluting materials, and the desirability of removing them from residential environments, it is seen as desirable to provide a liquid spray air purification system that is suitable for incorporation in residential as well as commercial applications. It is accordingly an object of the present invention to provide such a system.

SUMMARY OF THE INVENTION

In carrying out principles of the present invention, in accordance with a preferred embodiment thereof, an automatically controlled, self-cleaning liquid spray air purification system is provided and is illustratively incorporated in an air handling unit serving an interior building space.

The liquid spray air purification system includes a housing having open inlet and outlet ends and adapted to receive a throughflow of air in a downstream direction from the inlet end to the outlet end. Liquid dispersion filter means are disposed in the housing, in the path of air flowing therethrough and are operative to remove pollutants from the air using a liquid spray emanating from a source thereof and directed against the liquid dispersion filter means. Mist eliminator means are disposed in the housing downstream from the liquid dispersion filter means and are operative to remove liquid entrained in air exiting the liquid dispersion filter means.

Positioned beneath the liquid spray means and the mist eliminator means are sump means for holding a quantity of liquid to be supplied a recirculated manner to the liquid spray means, and for receiving liquid draining from the liquid dispersion filter means and the mist eliminator means during operation of the overall apparatus. Fill means are provided for automatically maintaining a predetermined liquid level in the sump means. A pump is used to operatively supply sump liquid to the liquid spray means and is connected thereto by conduit means in which a backwashable filter is interposed.

Valve means are interconnected in the conduit means, the valve means having a normal position in which the pump forces sump liquid to the liquid spray means through the conduit means, and a switched position in which the pump forces sump liquid through the filter in an opposite direction to backwash it, the backwashing sump liquid being discharged from the filter into the building drainage system.

First monitoring means are provided for detecting an increase in pumping back pressure upstream of the filter and/or an increase in the sump liquid pollutant level, both of which are indicative of a predetermined lessening in the filtration efficiency of the filter, and responsively creating a temporary switching of the valve means from their normal position to automatically backwash the filter as the need arises. The first monitoring means representatively are capable of detecting particulate and/or gaseous pollutants.

According to other features of the invention, second monitoring means are operative to sense a decrease in the normal concentration of chemical treatment additive in the water and/or a predetermined level of chemically treatable pollutants in the sump liquid and responsively inject a quantity of chemical treatment additive into the sump liquid from a source thereof; dehumidification means are provided in the housing, downstream from the mist eliminator means, for removing further moisture from air exiting the mist eliminator means; and fan means are provided for forcing air through the housing.

The air handling unit in which the air purification is representatively incorporated is a heating, ventilating and air conditioning unit including a cabinet structure having open inlet and outlet ends; blower means disposed in the cabinet structure and selectively operable to flow air through the cabinet structure, and heating and cooling means for selectively heating or cooling air passing through the cabinet structure as needed to maintain a predetermined temperature in the conditioned interior building space served by the unit.

The outlet end of the air purification system is communicated with the interior of the unit cabinet structure upstream of the blower means, and the inlet end of the unit cabinet structure is communicated with the conditioned space to draw return air therefrom. An adjustable return air damper structure is associated with the cabinet structure inlet end and is operative to selectively vary the amount of return air drawn into the inlet end of the cabinet structure.

A first portion of the air purification system housing inlet end is also communicated with the conditioned space to draw return air therefrom. An adjustable return air damper structure is associated with the housing inlet end and is operative to selectively vary the amount of return air drawn into the inlet end of the air purification system housing. Preferably, the return air damper structure of the air handling unit is linked to the return air damper structure of the air purification system in a manner such that an opening movement of one of the damper structures causes a closing movement of the other damper structure, and vice versa.

According to another feature of the invention a second portion of the inlet end of the air purification system housing is communicated with the exterior of the building to draw outside air therefrom. An adjustable fresh air damper structure is associated with the housing inlet end and is operative to regulate the amount of outside air being drawn into the air purification system during operation thereof. Preferably the return air and outside air damper structures of the air purification system housing are linked to one another in a manner such that an opening movement of one of these two damper structures causes a closing movement of the other damper structure, and vice versa.

BRIEF DESCRIPTION OF THE DRAWINGS

FIG. 1 is a schematic side elevational view of a representative heating, ventilation and air conditioning unit in which an improved liquid spray air purification system embodying principles of the present invention is operatively incorporated;

FIG. 2 is an enlarged scale schematic cross-sectional view through the unit and its associated air purification system;

DETAILED DESCRIPTION OF A PREFERRED EMBODIMENT

Figure 4:
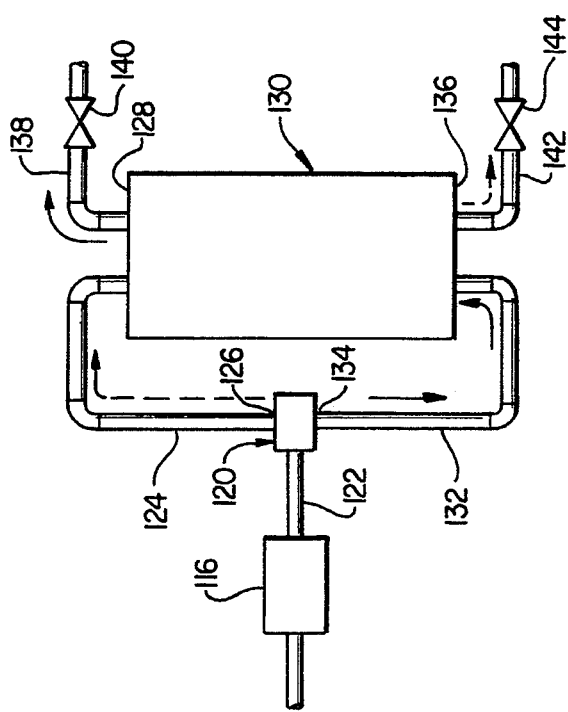
FIG. 4 is a partial top plan view of the liquid sump portion shown in FIG. 3.

Schematically depicted in FIG. 1 is a heating, ventilation and air conditioning (HVAC) unit 10 incorporating therein a specially designed liquid spray air purification system 12 embodying principles of the present invention. HVAC unit 10 serves an interior space 14 disposed within a building 16 having an exterior wall 18 and a roof 20. The conditioned interior space 14 representatively has a vertical interior wall 22 and a ceiling 24 spaced downwardly apart from the roof 20. The unit 10 is supported within the space 26 between the roof 20 the ceiling 24, in a horizontal airflow orientation, on suitable support members 28, such as metal hanger rods or straps, secured to the roof structure. A conventional thermostat 30 mounted on interior wall 22 senses the need for heating or cooling in the interior space 14 and appropriately controls the operation of the HVAC unit 10.

Referring now to FIGS. 1 and 2, the HVAC unit 10 includes a horizontally elongated hollow rectangular metal cabinet structure 32 having an open inlet end 34 and an open outlet end 36. From right to left as viewed in FIG. 2 the HVAC unit 10 has operatively disposed within its cabinet 32 a return air damper structure 38 adjacent the cabinet inlet end 34; a replaceable cartridge type air filter 40; a supply air blower 42; a heat exchanger 44; and a cooling coil 46. Representatively, the heat exchanger 44 is a fuel-fired heat exchanger having a burner structure 47 operatively associated therewith, and the cooling coil is of the direct expansion refrigerant type and is connected to conventional air conditioning refrigerant circuitry (not illustrated).

A return air duct 48 is interconnected between the cabinet inlet end 34 of the HVAC unit 10 and a suitable return air grille 50 mounted on the underside of the ceiling 24. At the opposite end of the unit 10 a main supply air duct 52 is connected to the cabinet outlet end 36 and extends horizontally through the above-ceiling space 26 as best illustrated in FIG. 1. Spaced apart branch supply air ducts 54 are operatively interconnected between the bottom of the main supply air duct 52 and a series of supply air diffusers 56 mounted on the underside of the ceiling 24 of the conditioned space 22 as schematically illustrated in FIG. 1.

Upon a demand for heat, or cooling as the case may be, by the thermostat 30 the supply air blower 42 and the heating or cooling portion of the unit 10 are appropriately energized. Operation of the blower 42 draws return air 58 upwardly into the cabinet 32, through the return air grille 50 and the return air duct 48, and then forces the air through the unit 10, across the heat exchanger 44 and the cooling coil 46, and into the main supply air duct 52. The heated or cooled air forced into the main supply air duct 52 is discharged into the space 22, in the form of conditioned air 58a, through the branch supply ducts 54 and the ceiling mounted air diffusers 56.

The HVAC unit 10 is merely representative of a wide variety of units, which may be generically referred to as "air handling" units, into which the air purification system 12, which will be subsequently described herein, may be operatively incorporated. For example, while the unit 10 has been illustratively described as being adapted to both heat and cool the conditioned space 22, it could alternatively be a heating-only unit, a cooling-only unit, or simply a ventilating unit. Additionally, while the unit 10 has been depicted in a horizontal interior air flow orientation, it could also be alternatively oriented in a vertical air flow orientation (of either the upflow or downflow variety).

Referring again to FIG. 2, the air purification system 12 includes a horizontally oriented hollow rectangular metal housing 60 representatively disposed in an upwardly spaced apart relationship with the return air duct 48 and a rear end portion of the unit cabinet 32. Housing 60 has an open inlet end 62 that faces the exterior wall 18, and an open outlet end 64. Operatively disposed within the housing 60 are, from right to left as viewed in FIG. 2, upper outside air and lower return air flow control damper sections 66 and 68 positioned at the inlet end of the housing 60; a liquid dispersion unit 70; a liquid spray air cleaner structure 72; a mechanical mist eliminator 74; dehumidification cooling coils 76; and an auxiliary supply air blower 78 disposed at the outlet end of the housing 60. As later described herein, a liquid sump pan structure 80 is positioned within the housing 60 beneath the air purification system components 70,72,74 and 76.

A discharge duct 82 is connected between the outlet end 64 of the housing 60 and a top side portion of the unit cabinet 32, generally between the filter 40 and the blower 42, and serves to communicate the interiors of the housing 60 and the unit cabinet 32. An auxiliary return duct 84 is operatively connected between the ceiling mounted return air grille 50 and the damper section 68, and an outside air intake duct 86 is operatively connected between the damper section 66 and an outside air intake louver 88 mounted on the exterior wall 18.

During operation of the main unit 10, simultaneous operation of the purification system air blower 78 draws return air 58 into the housing 60 sequentially through the a portion of the return air grille 50, the auxiliary return air duct 84 and the damper section 68. At the same time, outside air 90 is also drawn into the housing 60 sequentially through the outside air intake louver 88, the outside air duct 86 and the damper section 66. By the operation of the blower 78, these incoming quantities of return air and outside air are flowed across the purification and humidification components 70,72,74 and 76 to form a quantity of purified air 92 that is delivered into the unit cabinet 32 between the filter 40 and the main supply air blower 42. Together with the return air 58 entering the cabinet 32 through the damper section 38 and the filter 40 the purified air 92 forms the conditioned air 58a discharged from the supply air diffusers 56 (see FIG. 1).

It should be noted that both the purified air percentage of the conditioned air 58a delivered to the space 22 served by the unit 10, as well as the outside air-to-return air ratio of the purified air 92, may be conveniently controlled by suitable adjustment of the three damper sections 38,66 and 68—an adjustment that may be carried out manually or automatically depending upon the degree and type of air proportioning control desired in conjunction with the overall operation of the unit 10 and its associated air purification system 12. For example, the damper sections 38 and 68 shown in FIG. 2 are linked (as schematically indicated by the dashed line 94) in a manner such that a movement of the vanes of the damper section 38 toward their closed positions correspondingly moves the vanes of the damper section 68 toward their fully open positions, and vice versa. This permits the regulation of the total percentage of the discharge air 58a which has traversed the purification system 12.

Further, the damper sections 66 and 68 may be linked together in a manner such that movement of the vanes in the damper section 68 toward their fully closed positions automatically move the vanes in the damper section 66 toward their fully open positions, and vice versa. This permits the selective varying of the outside air-to-return air ratio of the purified air 92.

Still referring to FIG. 2, the water dispersion unit 70 is basically a pad of fibrous matting material (such as shredded plastic, fiberglass or metal) similar to the spray pad material used in evaporative coolers and is operative to receive a throughflow of air while at the same time being impinged upon by a cleansing liquid spray. The air cleaner structure 72 is representatively a horizontally spaced series of vertically extending tubes 96 having discharge orifices formed along their lengths and facing the downstream side of the water dispersion unit 70. The mist eliminator 74 representatively comprises a plurality of vertically spaced rows of horizontally extending angled baffle members 98 which, in a right-to-left direction define a zig-zag air flow path through the overall mist eliminator structure.

The dehumidification cooling coils 76, which are preferably included in the purification system 12, representatively are direct expansion refrigerant cooling coils the operation of which may be controlled by a conventional humidistat 100 operatively disposed in the main supply air duct 52. Other dehumidification means, such as an electrostatic precipitator, chemical dehumidifier, centrifugal mist eliminator, mist eliminator pad or desiccant pad or the like, may be used in place of or in addition to the coils 76 if desired. As will additionally be appreciated, the cooling medium for the coils 76 could be one other than refrigerant (such as chilled water) if desired.

During operation of the purification system blower 78 return air 58 and outside air 90 entering the inlet end 62 of the system housing 60 are drawn through the dispersion unit 70 while pressurized water 102, supplied to the tubes 96 from a subsequently described source, is sprayed onto the left or downstream side of the dispersion unit 70. Particulate and chemical pollutants in the return air/outside air mixture passing through the dispersion unit 70, such as dust, pollen, smoke, aerosols, nitrogen oxides, sulfur oxides, carbon dioxides and carbon monoxides, hydrogen sulfide and hydrocarbons, are absorbed into the impinging water spray and thus are drained with the spent water into the sump structure 80.

The purified, now moisture-laden return air/outside air mixture is then drawn, via the aforementioned zig-zag path, through the mist eliminator 74 which functions to mechanically remove a substantial portion of the moisture from the return air/outside air mixture. Water mechanically removed from the air in this manner is drained from the mist eliminator 74 and falls into the sump pan 80. Further moisture is removed from the air exiting the mist eliminator 74 by the dehumidification of the coils 76 as automatically called for by the humidistat 100. Accordingly, the air 92 entering the unit cabinet 32 is both cleansed of pollutants and dehumidified before being mixed with the return air 58 exiting the filter 40 and delivered to the conditioned space 22.

Figure 3:
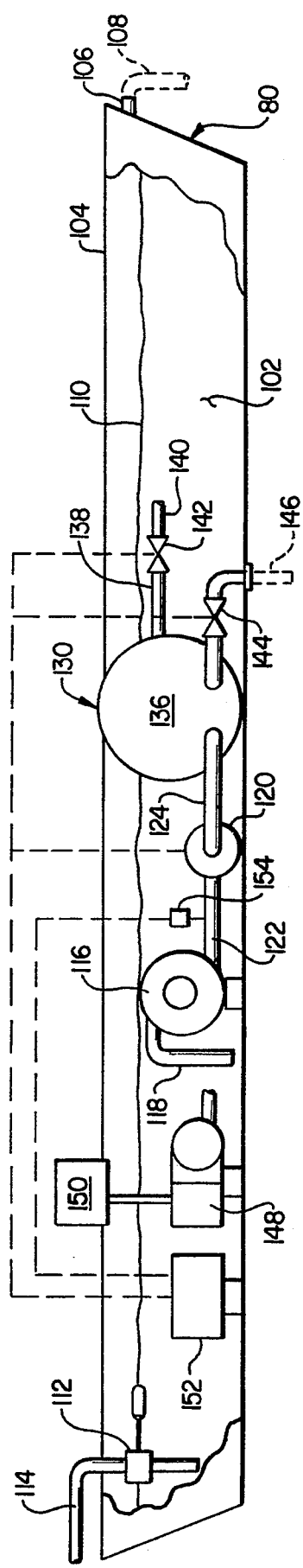
FIG. 3 is an enlarged scale partially cut away schematic side elevational view of a liquid sump portion of the air purification system.

Turning now to FIGS. 3 and 4, the sump pan 80 has an open top side 104 and an overflow fitting 106 secured to a side wall of the sump pan, just beneath its open top side, and connected to a suitable drain line 108 that is tied into the building drainage system. A quantity of water 102 is continuously maintained in the sump pan 80, at an operating level 110, by the operation of a float-operated fill valve 112 connected to a suitable water makeup supply pipe 114. Appropriate heating and/or cooling means (not illustrated) may be used to control the temperature of the water if desired.

A spray pump 116 is supported in the sump pan 80 and has an open-ended inlet pipe 118 submerged in the water 102. The outlet of the pump 116 is connected to the inlet of a two-way switchable diverting valve 120 by a discharge pipe 122. A pipe 124 is interconnected between the normally closed outlet port 126 of valve 120 and an end 128 of a cylindrical, backwashable filter structure 130, and a pipe 132 is connected between the normally open outlet port 134 of the valve 120 and the opposite end 136 of the filter structure 130.

A supply pipe 138 has a switchable, normally open valve 140 therein and is connected at one end to the end 128 of the filter structure 130 and at the opposite end to the vertical pipes 96 of the liquid spray air cleaner structure 72 (see FIG. 2). A discharge pipe 142 has a switchable, normally closed valve 144 therein and is connected at one end to the end 136 of the filter structure 130, and at its opposite end to a drain line 146 extending from the bottom side of the sump pan and connected to the building drainage system.

During normal operation of the purification system 12 the pump 116 forces water 102 from the sump pan 80 to the spray pipes 96 sequentially through the pipe 122, the normally open outlet 126 of the valve 120, the interior of the filter 130, and the pipe 138 (as indicated by the solid line flow arrows in FIG. 3) to thereby create the water spray that continuously impinges on the downstream side of the water dispersion unit 70 (see FIG. 2). Pollutant-bearing water also continuously drains from the previously described air purifying components of the system 12 back into the sump pan 80 and is recycled through and cleansed by the filter structure 130 on its way back to such air purifying components.

Even with the pollutant cleansing action of the filter 130, as the filter nears its fully loaded state the levels of various contaminants in the sump water will increase. A monitor and additive injector 148 is disposed in the sump water 102 and is operative to sense a decrease in the normal concentration of chemical treatment additive in the water and/or the buildup therein of undesirable water pollutants, such as algae, slime, bacteria and fungi, and responsively inject a suitable chemical additive, from an additive container 150 connected to the monitor/injector 148, into the sump water to control the buildup of these water pollutants and thereby reduce their deleterious effects on the air cleansing efficiency of the recirculating sump water. The additive in the container 150 may representatively contain (1) selected non-toxic organic or inorganic chemicals which assist in cleaning the air of difficult to remove pollutants and/or (2) non-toxic bactericides, fungicides, herbicides and the like to control the aforementioned water pollutants.

A monitor and filtering control structure 152 is also disposed in the sump water 102 and is electrically coupled to the valves 120, 140 and 144 via the schematically depicted dashed control lines in FIG. 4. The monitor/control structure 152 is operative to sense an increase in back pressure indicated by a pressure transducer 154 located in pump discharge pipe 122 upstream of the filter 130 and/or the presence of a predetermined maximum level of particulate and gaseous air pollutants in the sump water 102 (which have been withdrawn from the air flowing through the purification system) and responsively switch the valves 120, 140 and 144 in a manner (1) opening the normally closed outlet 126 in valve 120 and closing its normally open outlet 134, (2) closing the normally open valve 140, and (3) opening the normally closed valve 144.

The switching of these three valves causes the water being discharged from the pump 116 to backwash the filter 130 by forcing sump water sequentially through the pipe 122, the opened valve outlet 126, through the filter 130 from top to bottom as viewed in FIG. 4, and through the pipe 142 and the opened valve 144 into the drain pipe 146 as indicated by the dashed line flow arrows in FIG. 4. Accordingly, the trapped particulate matter and other pollutant matter in the filter are flushed into the building drainage system via the drain pipe 146. In response to the resulting drop in the sump water level, the float-operated fill valve 112 opens to replenish the sump water supply with clean water. When the particulate/gaseous pollutant level in the sump water falls to an acceptable level the monitor structure 152 responsively permits the valves 120, 140 and 144 to return to their normal operating positions to permit the pump 116 to deliver water to the liquid spray air cleaner structure 72 through the now backwashed filter 130.

As can be seen from the foregoing, the incorporation of the air purification system 12 into the representative air handling unit 10 affords the unit the ability to continuously flow highly purified air into the conditioned interior building space 22 served by the unit. The cooperative use of the damper structures 38, 66 and 68 permits control of the overall volumetric air cleansing rate of the purification system 12 while at the same time permitting a selectively variable quantity of outside ventilation air to be introduced into the conditioned space. Moreover, the automatic control characteristics of the liquid spray purification system 12 substantially reduce the amount of inspection and maintenance time required to keep it in good working order. The unit 10 is thus quite suitable for both residential and commercial heating, ventilating and air conditioning applications.

The foregoing detailed description is to be clearly understood as being given by way of illustration and example only, the spirit and scope of the present invention being limited solely by the appended claims.

What is claimed is:

1. Liquid spray apparatus for purifying air, comprising:

a housing having an open inlet end and an open outlet end and having means for receiving a throughflow of air in a downstream direction from said open inlet end to said open outlet end;

liquid dispersion filter means, positioned in said housing in the path of air flowing therethrough, for removing pollutants from the air using a liquid spray emanating from a source thereof and directed against said liquid dispersion filter means;

liquid spray means, disposed in said housing, for receiving pressurized liquid from a source thereof and spraying the received liquid onto said liquid dispersion filter means;

mist eliminator means, positioned in said housing downstream from said liquid dispersion filter means, for removing liquid entrained in air exiting said liquid dispersion filter means;

sump means for holding a quantity of liquid to be supplied in a recirculated manner to said liquid spray means, and for receiving liquid draining from said liquid dispersion filter means and said mist eliminator means during operation of said apparatus;

fill means for automatically maintaining a predetermined liquid level in said sump means;

a filter structure through which sump liquid may be selectively flowed in a filtering direction or an opposite backwashing direction;

a pump having an inlet communicatable with liquid in said sump means, and an outlet;

conduit means, interconnecting said pump, said filter structure and said liquid spray means, for forming with said filter structure alternatively selectable first and second sump liquid flow paths, said first sump liquid flow path extending sequentially from said pump outlet through said filter structure in said filtering direction, and from said filter structure to said liquid spray means, said second sump liquid flow path sequentially extending from said pump outlet to said filter structure, through said filter structure in said backwashing direction, and from said filter structure to a drainage location external to said sump means;

valve means connected in said conduit means, said valve means being normally operative in a first position to cause sump liquid being discharged from said pump outlet to flow through said first sump liquid flow path, but being switchable to a second position to cause sump liquid being discharged from said pump outlet to flow through said second sump liquid flow path; and first monitoring means for detecting a change in an apparatus operating parameter, indicative of a predetermined lessening in the filtration efficiency of said filter structure, and responsively creating a temporary switching of said valve means from said first position thereof to said second position thereof.

2. The liquid spray apparatus of claim 1 wherein:
said change in an apparatus operating parameter is an increase in the concentration of particulate pollutants in the sump liquid.

3. The liquid spray apparatus of claim 1 wherein:
said change in an apparatus operating parameter is an increase in the concentration of gaseous pollutants in the sump liquid.

4. The liquid spray apparatus of claim 3 wherein:
said first monitoring means are further operative to sense an increase in pump back pressure in said first sump liquid flow path and responsively create a temporary switching of said valve means from said first position thereof to said second position thereof.

5. The liquid spray apparatus of claim 1 further comprising:
second monitoring means for detecting a change in an apparatus operating parameter and responsively injecting a quantity of chemical treatment additive into the sump liquid from a source thereof.

6. The liquid spray apparatus of claim 5 wherein:
said change in an apparatus operating parameter is an increase in chemically treatable pollutants in the sump liquid above a predetermined maximum level of chemically treatable pollutants therein.

7. The liquid spray apparatus of claim 5 wherein:
said change in an apparatus operating parameter is a decrease, below a predetermined level, of chemical treatment additive in the sump liquid.

8. The liquid spray apparatus of claim 7 wherein:
said second monitoring means are further operative to detect an increase in chemically treatable pollutants in the sump liquid above a predetermined maximum level of chemically treatable pollutants therein and responsively inject a quantity of chemical treatment additive into the sump liquid from a source thereof.

9. The liquid spray apparatus of claim 1 further comprising:
dehumidification means positioned in said housing downstream from said mist eliminator means and selectively operable to remove further moisture from air exiting said mist eliminator means.

10. The liquid spray apparatus of claim 5 wherein:
said dehumidification means include a cooling coil.

11. The liquid spray apparatus of claim 1 further comprising:
adjustable first and second dampener means positioned in said housing upstream from said liquid dispersion filter means and through which first and second separate quantities of air may be respectively drawn into said open inlet end of said housing.

12. The liquid spray apparatus of claim 11 wherein:
each of said first and second damper means is adjustable between open and closed positions, and
said first and second damper means are linked to one another in a manner such that adjustment of either of said first and second damper means toward their open position correspondingly moves the other of said first and second damper means toward their closed position, and vice versa.

13. The liquid spray apparatus of claim 1 further comprising:
fan means for forcing air through said housing from said open inlet end thereof to said open outlet end thereof.

14. The liquid spray apparatus of claim 13 wherein:
said fan means are positioned within said housing downstream from said mist eliminator means.

15. The liquid spray apparatus of claim 1 wherein:
said mist eliminator means are operative to mechanically remove liquid from air exiting said liquid dispersion filter means.

16. The liquid spray apparatus of claim 15 wherein:
said mist eliminator means include vane means for causing air traversing said mist eliminator means to follow a generally zig-zag flow path therethrough.

17. An air handling unit for supplying a recirculated flow of air to a conditioned space within a building, comprising:
a cabinet structure having open inlet and outlet ends;
blower means positioned in said cabinet structure and selectively operable to flow air through said cabinet structure in a downstream direction form said inlet end thereof to said outlet end thereof;
air temperature control means selectively operable to alter the temperature of air flowing through said cabinet structure from said inlet end thereof to said outlet end thereof; and
a liquid air purification system operative to remove pollutants from air to be discharged from said outlet end of said cabinet structure, said liquid spray air purification system including:
a housing positioned exteriorly of said cabinet structure and having an open inlet end and an open outlet end, said housing having means for receiving a throughflow of air in a downstream direction from its open inlet end to its open outlet end, said outlet end of said housing being communicated with the interior of said cabinet structure upstream of said blower means, liquid dispersion filter means, positioned in said housing in the path of air flowing therethrough, for removing pollutants from such air using a liquid spray emanating from a source thereof and directed against said liquid dispersion filter means, liquid spray means, positioned in said housing, for receiving pressurized liquid from a source thereof and spraying the received liquid onto said liquid dispersion filter means, mist eliminator means, positioned in said housing downstream from said liquid dispersion filter means, for removing liquid entrained in air exiting said liquid dispersion filter means, sump means for holding a quantity of liquid to be supplied in a recirculated manner to said liquid spray means, and for receiving liquid draining from said liquid dispersion filter means and said mist eliminator means during operation of said liquid spray air purification system, fill means for automatically maintaining a predetermined liquid level in said sump means, a filter structure through which liquid may be selectively flowed in a filtering direction or an opposite backwashing direction, a pump having an inlet communicatable with liquid in said sump means, and an outlet, conduit means, interconnecting said pump, said filter structure and said liquid spray means, for forming with said filter structure alternatively selectable between first and second sump liquid flow paths, said first sump liquid flow path extending sequentially from said pump outlet through said filter structure in said filtering direction, and from said filter structure to said liquid spray means, said second sump liquid flow path sequentially extending from said pump outlet to said filter structure, through said filter structure in said backwashing direction, and from said filter structure to a drainage location external to said sump means, valve means connected in said conduit means, said valve means being normally operative in a first position to cause sump liquid being discharged from said pump outlet to flow through said first sump liquid flow path, but being switchable to a second position to cause sump liquid being discharged from said pump outlet to flow through said second sump liquid flow path, and first monitoring means for detecting a change in an apparatus operating parameter, indicative of a predetermined lessening in the filtration efficiency of said filter structure, and responsively creating a temporary switching of said valve means from said first position thereof to said second position thereof.

18. The air handling unit of claim 17 wherein said air temperature control means include:

a heat exchanger structure positioned in said cabinet structure and selectively operable to add heat to air flowing through said cabinet structure.

19. The air handling unit of claim 17 wherein said air temperature control means include:

a cooling coil positioned in said cabinet structure and selectively operable to remove heat from air flowing through said cabinet structure.

20. The air handling unit of claim 17 wherein:

said inlet end of said cabinet structure is communicatable with the conditioned space to receive return air therefrom and has a first adjustable damper structure operative to selectively regulate the quantity of return air received through said inlet end of said cabinet structure from the conditioned space, and at least a portion said inlet end of said housing is communicatable with the conditioned space to receive return air therefrom and has a second adjustable damper structure operative to selectively regulate the quantity of return air received through said inlet end of said housing from the conditioned space.

21. The air handling unit of claim 20 wherein:

said first and second adjustable damper structures are linked in a manner such that a movement of one of said first and second damper structures toward an open position thereof causes a movement of the other of said first and second damper structures toward a closed position thereof, and vice versa.

22. The air handling unit of claim 21 wherein:

a second portion of said inlet end of said housing is communicatable with the exterior of the building to receive outside air therefrom, and said air handling unit further comprises a third adjustable damper structure communicating with said second portion of said inlet end of said housing and operative to selectively regulate the quantity of outside air received by said inlet end of said housing.

23. The air handling unit of claim 22 wherein:

said second and third adjustable damper structures are linked in a manner such that when either of them is moved toward an open position the other is responsively moved toward a closed position, and vice versa.

24. The air handling unit of claim 17 wherein:

said change in an apparatus operating parameter is an increase in the concentration of particulate pollutants in the sump liquid.

25. The air handling unit of claim 17 wherein:

said change in an apparatus operating parameter is an increase in the concentration of gaseous pollutants in the sump liquid.

26. The air handling unit of claim 25 wherein:

said first monitoring means are further operative to sense an increase in pump back pressure in said first sump liquid flow path and responsively create a temporary switching of said valve means from said first position thereof to said second position thereof.

27. The air handling unit of claim 17 further comprising:

second monitoring means for detecting a change in an apparatus operating parameter and responsively injecting a quantity of chemical treatment additive into the sump liquid from a source thereof.

28. The air handling unit of claim 27 wherein:

said change in an apparatus operating parameter is an increase in chemically treatable pollutants in the sump liquid above a predetermined maximum level of chemically treatable pollutants therein.

29. The air handling unit of claim 27 wherein:

said change in an apparatus operating parameter is a decrease, below a predetermined level, of chemical treatment additive in the sump liquid.

30. The liquid spray apparatus of claim 29 wherein:
said second monitoring means are further operative to detect an increase in chemically treatable pollutants in the sump liquid above a predetermined maximum level of chemically treatable pollutants therein and responsively inject a quantity of chemical treatment additive into the sump liquid from a source thereof.

31. The air handling unit of claim 17 further comprising:
dehumidification means positioned in said housing downstream from said mist eliminator means and selectively operable to remove further moisture from air exiting said mist eliminator means.

32. The air handling unit of claim 31 wherein:
said dehumidification means include a cooling coil.

33. The air handling unit of claim 17 further comprising:
fan means for forcing air through said housing from said open inlet end thereof to said open outlet end thereof.

34. The air handling unit of claim 33 wherein:
said fan means are positioned within said housing downstream from said mist eliminator means.

35. The air handling unit of claim 17 wherein:
said mist eliminator means are operative to mechanically remove liquid from air exiting said liquid dispersion filter means.

36. The air handling unit of claim 35 wherein:
said mist eliminator means include vane means for causing air traversing said mist eliminator means to follow a substantially zig-zag flow path therethrough.

* * * * *